(12) United States Patent
Shu

(10) Patent No.: US 6,363,718 B1
(45) Date of Patent: Apr. 2, 2002

(54) METHOD FOR ACCUMULATING ENERGY FROM NATURAL POWER

(76) Inventor: Chau-Fu Shu, 2F, No. 3, Alley 5, Lane 76, Chung-Cheng Road, Hsin-Tien Taipei Hsien (TW)

( * ) Notice: Subject to any disclaimer, the term of this patent is extended or adjusted under 35 U.S.C. 154(b) by 0 days.

(21) Appl. No.: 09/417,212

(22) Filed: Oct. 13, 1999

(30) Foreign Application Priority Data

Oct. 20, 1998 (TW) .................................. 87117428 A

(51) Int. Cl.[7] .................... F16D 31/02; B60K 16/00; F04B 17/00
(52) U.S. Cl. .................... 60/398; 60/641.8; 417/333
(58) Field of Search ............................ 60/398, 641.8; 417/332, 333, 334, 335, 336; 416/119, 17, 12, 110, 111, 112, 116

(56) References Cited

U.S. PATENT DOCUMENTS

| | | | |
|---|---|---|---|
| 953,566 A | * 3/1910 | Wagner et al. ............... | 416/12 |
| 3,996,741 A | * 12/1976 | Herberg ....................... | 60/398 |
| 4,101,244 A | * 7/1978 | Grotberg ...................... | 416/41 |
| 4,319,454 A | * 3/1982 | Lucia ........................... | 60/506 |
| 5,708,305 A | 1/1998 | Wolfe ........................... | 290/53 |
| 5,710,464 A | 1/1998 | Kao et al. .................... | 290/53 |
| 5,735,665 A | 4/1998 | Kang ............................ | 415/3.1 |
| 5,770,893 A | 6/1998 | Youlton ........................ | 290/53 |
| 5,789,862 A | 8/1998 | Makino ......................... | 313/584 |
| 5,808,368 A | 9/1998 | Brown .......................... | 290/53 |

* cited by examiner

*Primary Examiner*—F. Daniel Lopez
*Assistant Examiner*—Michael Leslie
(74) *Attorney, Agent, or Firm*—Bacon & Thomas

(57) ABSTRACT

The natural power of the present invention includes a wind energy, sea wave energy, and solar energy. These energies are used in high energy for achieving an economic value. The current conversion devices, for example, water power generation, wind power generation, and solar power generation, coverts power in high energy. If the energy is low, they can not work well. In fact, in natural power, low power or middle power energies are occupied a large part. The present invention serves to disclose a system for solving such a problem. In the present invention, low power energy is firstly accumulated to a high power energy for being used (such as hydraulic power). The system in the present invention can be wholly used in natural power in the low cost without any pollution. Thus, the present invention is suitable for the requirement of environment protection and economics. The area arranged according to the feature of the present invention can be programmed as an appreciating area.

4 Claims, 16 Drawing Sheets

METHOD FOR ACCUMULATING ENERGY FROM NATURAL POWER

BACKGROUND OF THE INVENTION

The present invention relates to a natural power about wind energy, sea wave energy, and solar energy. These energies are used in large energies. For example, wind power is generated by wind force to drive a generator, it is effective as the wind is strong. Thus, it is confined by geography and thus cannot be used widely. For example, sea wave energy cannot be performed effectively. Since the sea level is not fixed, which changes with time, hour, day and month. Moreover, the size of the sea wave is irregular. For example, in solar energy generation, the output is viewed as a load. In application, according to the requirement of load, a large amount of solar batteries are necessary. Thus, the cost is high and does not conform to the requirement of economics.

SUMMARY OF THE INVENTION

Therefore, the present invention severs to use low power energy from natural power. In the present invention, power is accumulated and stored to become high power energy and then is used effectively. Currently, most areas have low or middle powers, thus, by the present invention, these low power energy can be used widely without any pollution and thus conforms the requirement of economics. The area arranged according to the feature of the present invention can be programmed as an appreciating area.

The primary structure of the present invention is formed by energy conversion devices, air storing tanks, energy accumulating devices and a reservoir. By the power of natural power, and energy conversion devices, the power can be converted as dynamic energy of air for being stored in an air storing tank. Then the energy in the air storing tank serves as power for rising water in a low level to a high level. Finally, this high level water flows into a reservoir to accumulate to a predetermined amount for further being used. The energy conversion devices of the present invention can be classified into three classes.

In the present invention, according to the features of geography, one or more energy conversion devices can be used. For example, in seashore, wind energy conversion devices, sea wave energy conversion devices and solar energy conversion devices can be used. In the land, wind energy conversion devices and solar energy conversion devices can be used.

The solar energy conversion device is currently used, and thus, it is not the primary concern of the present invention. The wind energy conversion device uses directional wind blades which swing with the wind direction. The directional power serves to control the wind blades. As the wind blade moves along the wind direction, then it is vertical. Inversely, it is horizontal to accept a minimum wind resistance. Therefore, the wind energy can be converted into rotary power to drive air pumps so as to become air dynamics. The power of air is further stored in an air storing tank. The air power from the air pumps can be classified into two classes: one is high pressure air with a pressure larger than atmosphere pressure, and one is low pressure air with a pressure smaller then atmosphere pressure.

In the sea wave energy conversion device, a movable pontoon moving with the level of sea wave stops on the sea level. When sea wave is high (higher than sea level), the pontoon will rise by buoyancy. When sea wave descends, the pontoon will descend due to weight itself. Therefore, whenever the pontoon rises or descends, by a set of linkage and ratchet, the pontoon can generate a rotary power. Then, by the transmission assembly, a continuous rotary power is generated. This power will output with the displacement of pontoon and numbers of displacement. Thus rotary force may directly drive air pumps to generate dynamic power of air. This air power is stored in an air storing tank.

In the present invention, the energy accumulating device uses the air power of air storing tank (high pressure or low pressure). The object thereof is to rise water of low level to high level. In this system, according to the pressure of the air storing tank it can be classified as high pressure air and low pressure air. In the system for using a high pressure air, a container with a fixed volume is used. As the water of low level is full, a high pressure air is input to push water to a level of high pressure (atmosphere pressure). The potential energy from level difference of water is equal to the difference of air pressure. In the height, an identical container is located and is sustained in an atmosphere pressure for receiving this water of low level. When the water in the container is completely drained out gradually, the high pressure air is closed and atmosphere is communicated. Then, the container is restored to the original state for storing water. Thus, the water in one container can be driven by air energy to be risen to a container with a fixed height. Similarly, in the container of fixing height, the water therewithin can be drive by the same high pressure air to be further risen to another container of fixed height. The process can be repeated. Such driving force of high pressure air can be transferred to different containers of different levels. Namely, the water level can be risen stage by stage.

In the energy accumulating device of the present invention, a container of fixed volume is communicated with a low pressure air to be at a lower pressure. Thus, for water of low level, in atmosphere pressure, it can be risen to a container (the potential for rising water is equal to the energy of difference of air pressure. As water is full. The low pressure air source is closed and is communicated with atmosphere. Therefore, for the water in low level and in atmosphere pressure, if it is absorbed by a low pressure air, the water will rise to a container of fixing height. Similarly, the water in the container of fixing height can be absorbed by the same low pressure air so as to be risen to another container of another fixing height. Therefore, by this absorbing force of low pressure air, the water in lower level can be transferred to different layers.

In the present invention, a natural power of low or middle power can be converted to rise the level of water so that the energy is stored in a water. Therefore, the cost is low. Moreover, the present invention conforms to the requirement of environmental protection.

The various objects and advantages of the present invention will be more readily understood from the following detailed description when read in conjunction with the appended drawing.

DETAILED DESCRIPTION OF THE PREFERRED EMBODIMENTS

Figure 1:
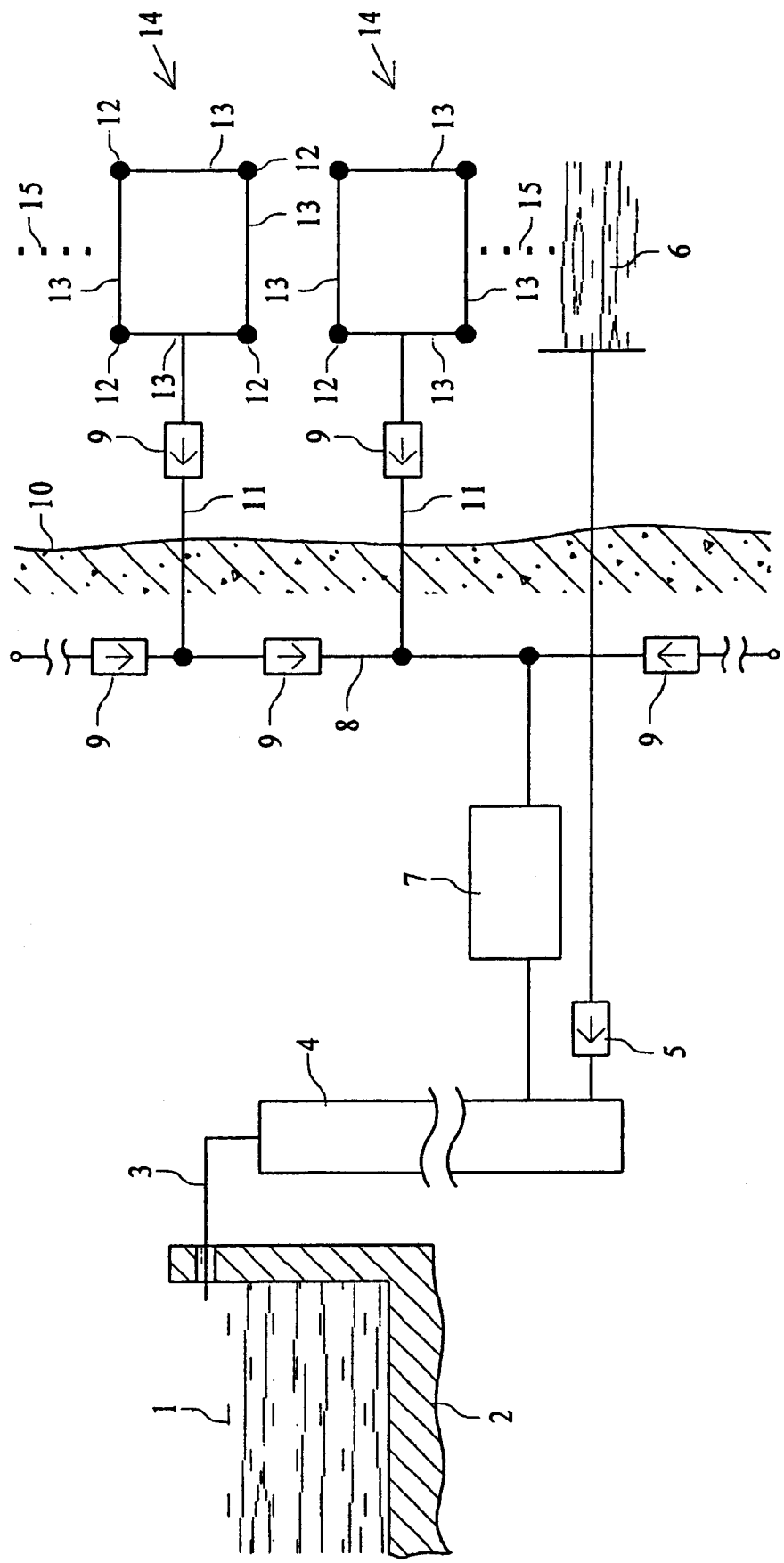
FIG. 1 is a schematic view about energy conversion of a natural power.

FIG. 1 is a schematic view about energy conversion of a natural power. The energy of natural energy source is converted to be stored in air, then the energy is further stored in an energy accumulating device for converting the water level from a lower level to a high level.

Water 1 in FIG. 1 is in high level, The water 1 is firstly stored in a reservoir 2. A water tube 3 serves to output water from an energy accumulating device 4. Sea water 6 is in lower level, which is input to the energy accumulating device 4 through a check valve 5. One end of the air storing tank 7 is connected to the energy accumulating device 4, while another end is connected to an air transmission tube 8. A plurality of energy conversion devices 12 are installed at the seashore 10. Each four energy conversion devices 12 are fixed by a connecting body 13 so as to form an energy conversion region 14. The extension region 15 represents the expansion of the energy conversion region 14. The energy converted by the energy conversion region 14 is concentrated in the air transmission tube 8 through an air valve 9 by an air transmission tube 11, and then enters into the air storing tank 7.

The energy of natural power is converted by the energy conversion device 12 to be stored in air, then the air enters into an air storing tank 7. The energy accumulating device 4 uses the dynamic energy of air in the air storing tank 7 to convert the sea water 6 of lower level to the sea water 1 of high level.

Figure 2:
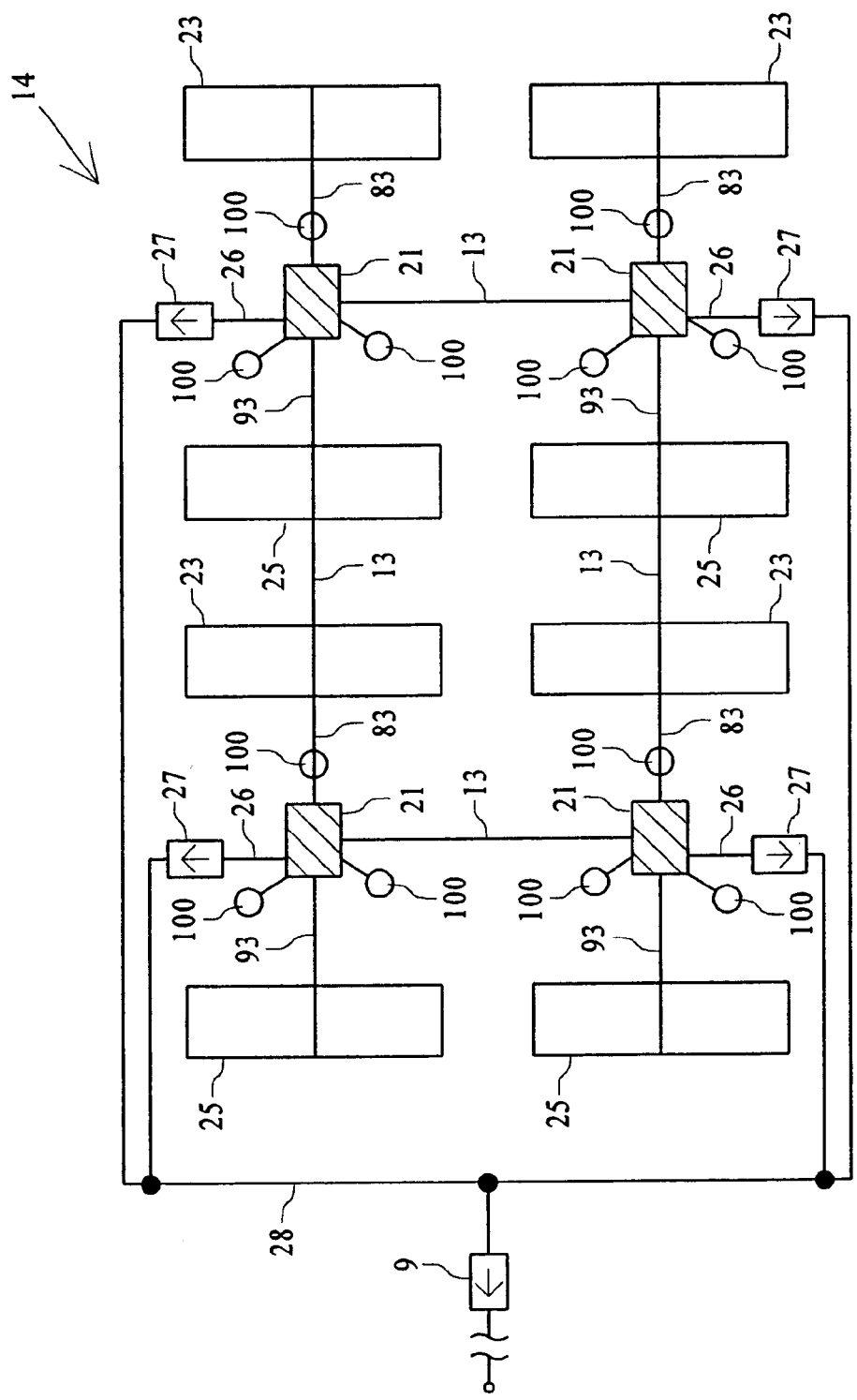
FIG. 2 is an upper view of the energy conversion region of FIG. 1.
Figure 2A:
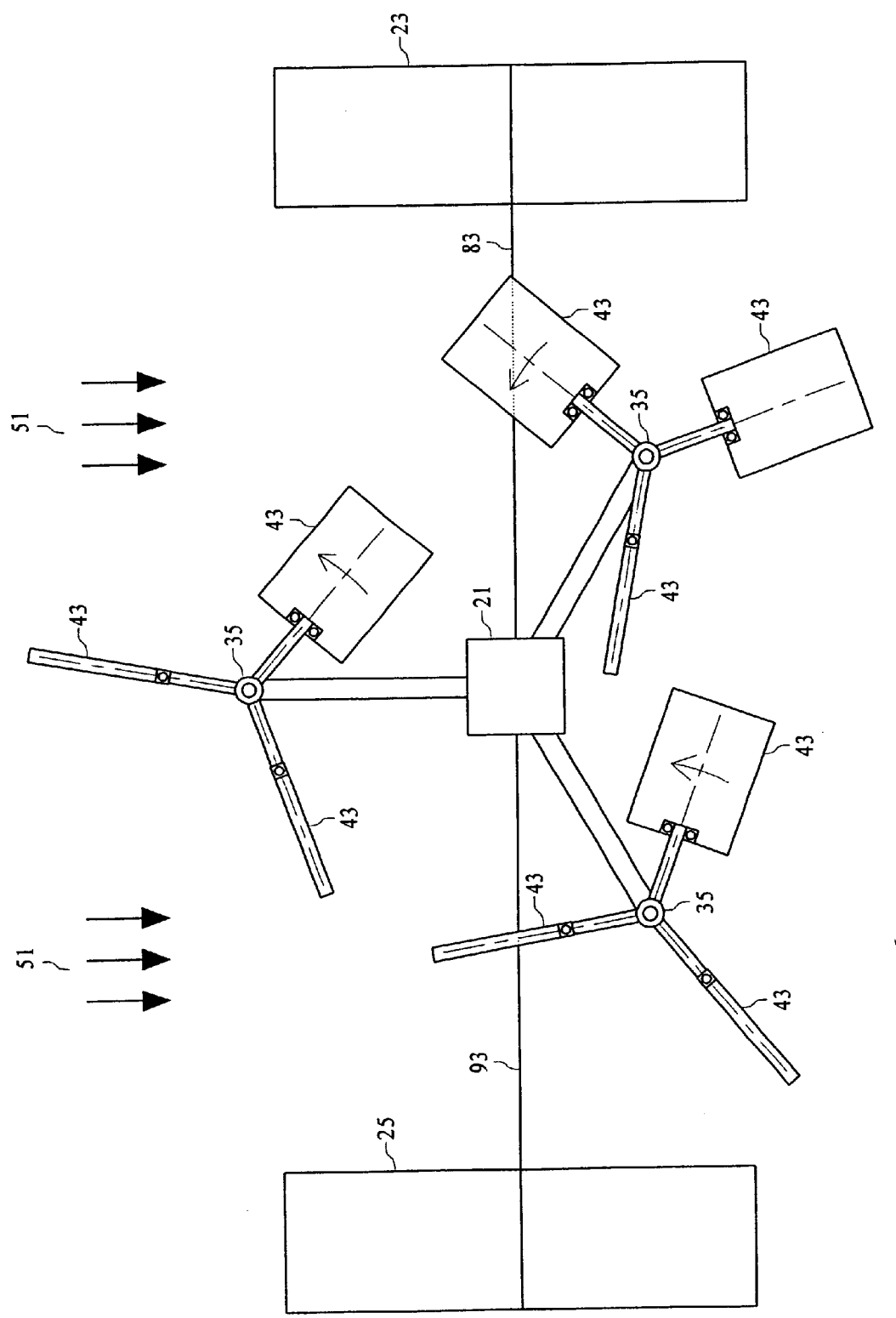
FIG. 2A is an upper view of the energy conversion device of the energy conversion region of FIG. 2.
Figure 2B:
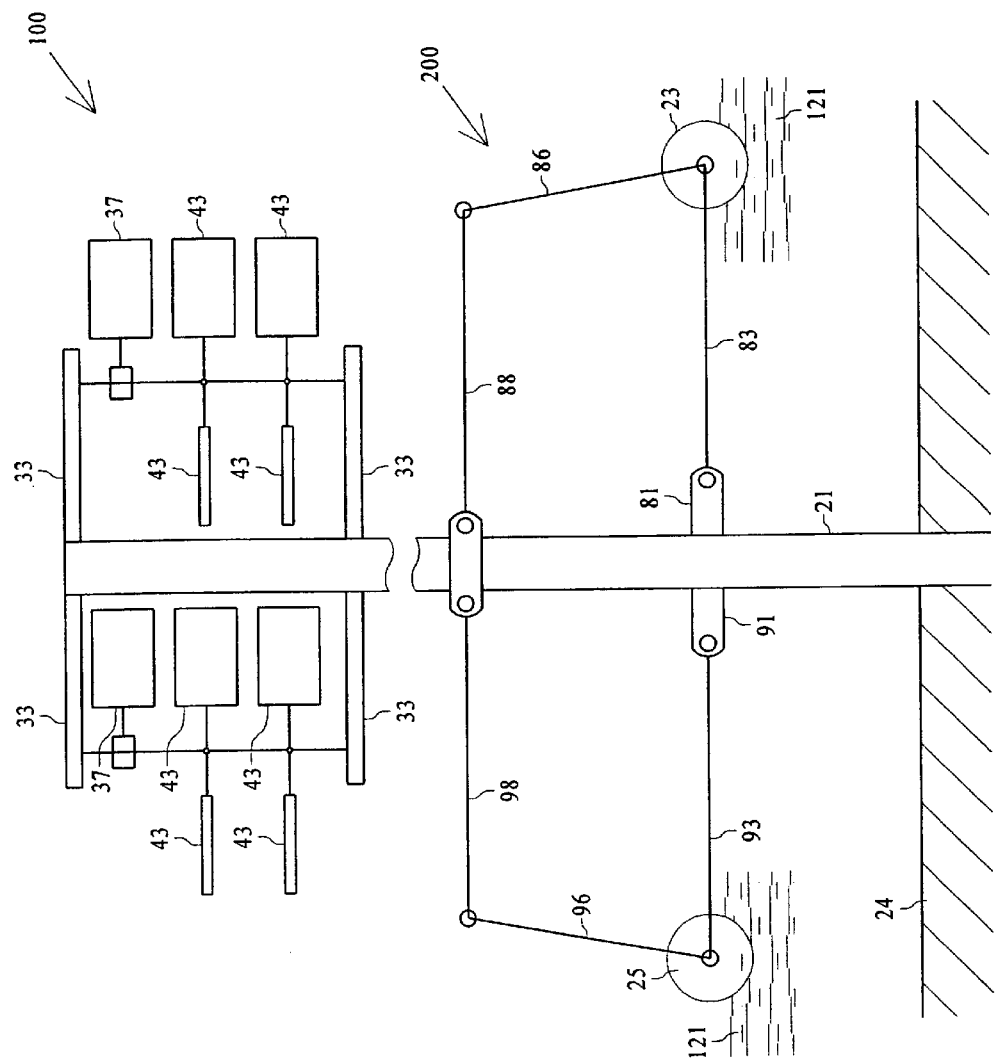
FIG. 2B is a front view of the energy conversion region of FIG. 2.

Please refers to FIGS. 2, 2A and 2B. There are four supporters 21 which are fixed by connecting bodies 13. A pontoon 23 and a pontoon 25 are connected to the supporters 21 by linkages 83 and 93. The air transmission tube 26 is connected to the air transmission tube 28, air valve 9 and wind energy conversion device 100 through the air valve 27.

There are two energy conversion devices, as shown in FIG. 2B, wherein the upper layer is the wind energy conversion device 100, and the lower layer is the sea wave energy conversion device 200, with the supporter 21, fixed on the floor 24 of the sea near the seashore, supporting both devices.

At the upper layer of the supporter 21, there are three wind energy conversion devices 100 installed with an equal angle, and the wind blades within each device, when driven by wind, are independently capable of rotating and outputting power.

The sea wave energy conversion device 200, at the lower layer of the supporter 21, contains two pontoons 23 and 25 which, by moving up and down following the sea wave, can provide kinetic energy through connecting apparatus.

In the energy conversion region 14, each supporter 21 has two kind of energy conversion devices, one is wind energy conversion devices 100, which including three devices that are installed with an equal angle. Another is sea wave energy conversion device 200, wherein the pontoon 23 and pontoon 25 are serves to convert the energy of sea wave. The air dynamic energies from these two energy conversion devices are output through an air transmission tube 26. Through the air valve 27, it is connected to the air transmission tube 28. Finally, the air dynamic energy is output from the air valve 9.

Figure 3:
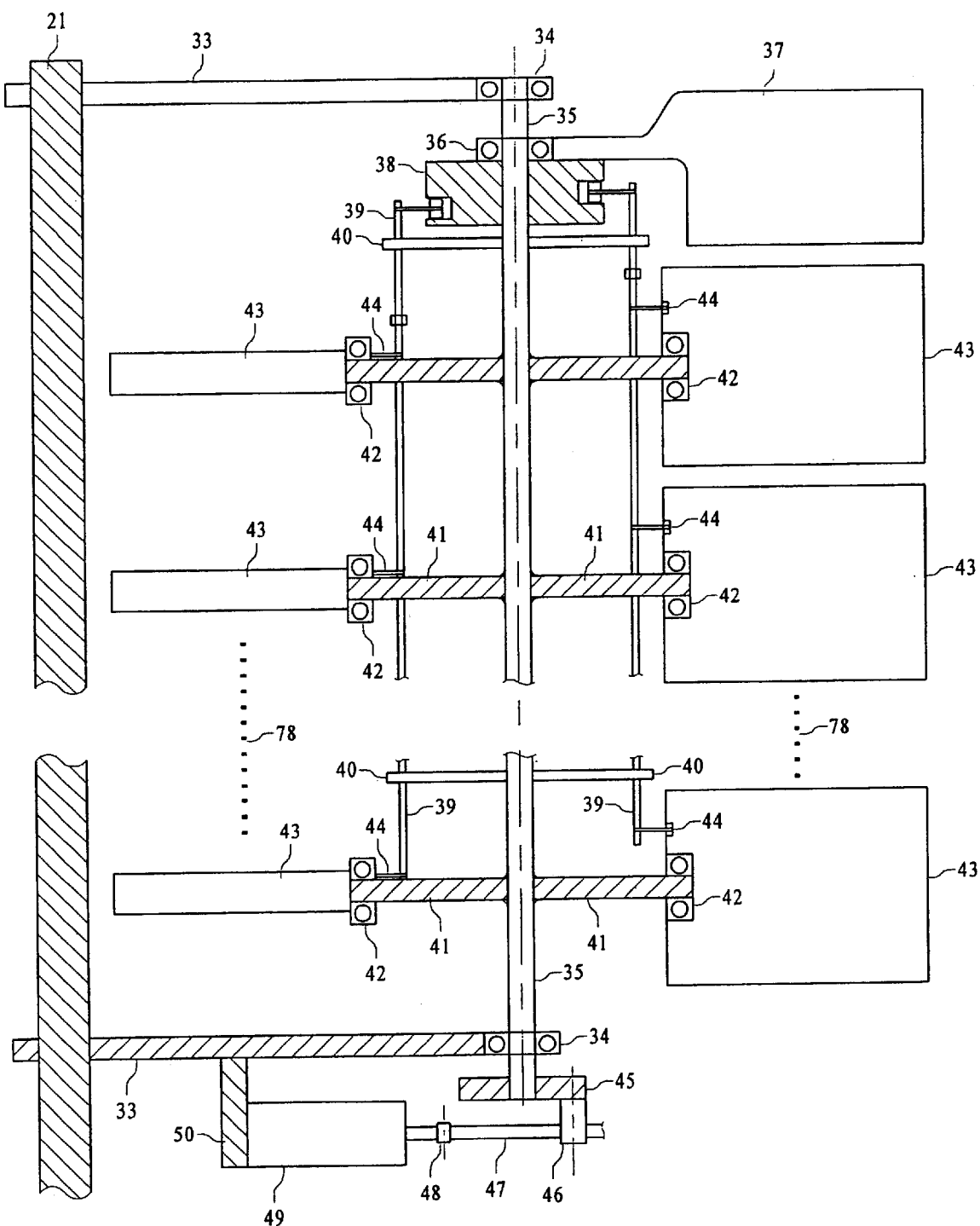
FIG. 3 is a cross-sectional view of the wind energy conversion device shown in FIG. 2B.

In FIG. 3, the supporter 21 and the supporting rod 33 are connected as a rigid body. The transmission shaft 35 is supported on the supporting rod 33 by a bearing 34. A direction blade 37 is connected with a cam 38, and is connected to a transmission shaft 35 by a bearing 36. A linkage 39 is supported by a supporting shaft 40 which is fixed to the transmission shaft 35. One end of the supporting rod 41 is fixed to the transmission shaft 35 so as to rotate synchronously with the transmission shaft 35. Another end thereof is combined with a wind blade 43 by a bearing 42, and thus, the wind blade 43 also rotates synchronously with the transmission shaft 35. The sleeve 44 on the wind blade 43 is driven by the linkage 39 so that the wind blade 43 swings with a supporting rod 41. A curved wheel 45 is fixed to the transmission shaft 35. A curved shaft 46 is connected to the curved wheel 45 and linkage 47. Another end of the linkage 47 is connected to the supporting shaft 48. The supporting shaft 48 pushes the air pump 49. The supporting rod 50 supports the air pump 49 to be fixed to the supporting rod 33. The extension regions 78 represent the expansion of the wind blade 43.

Figure 4:
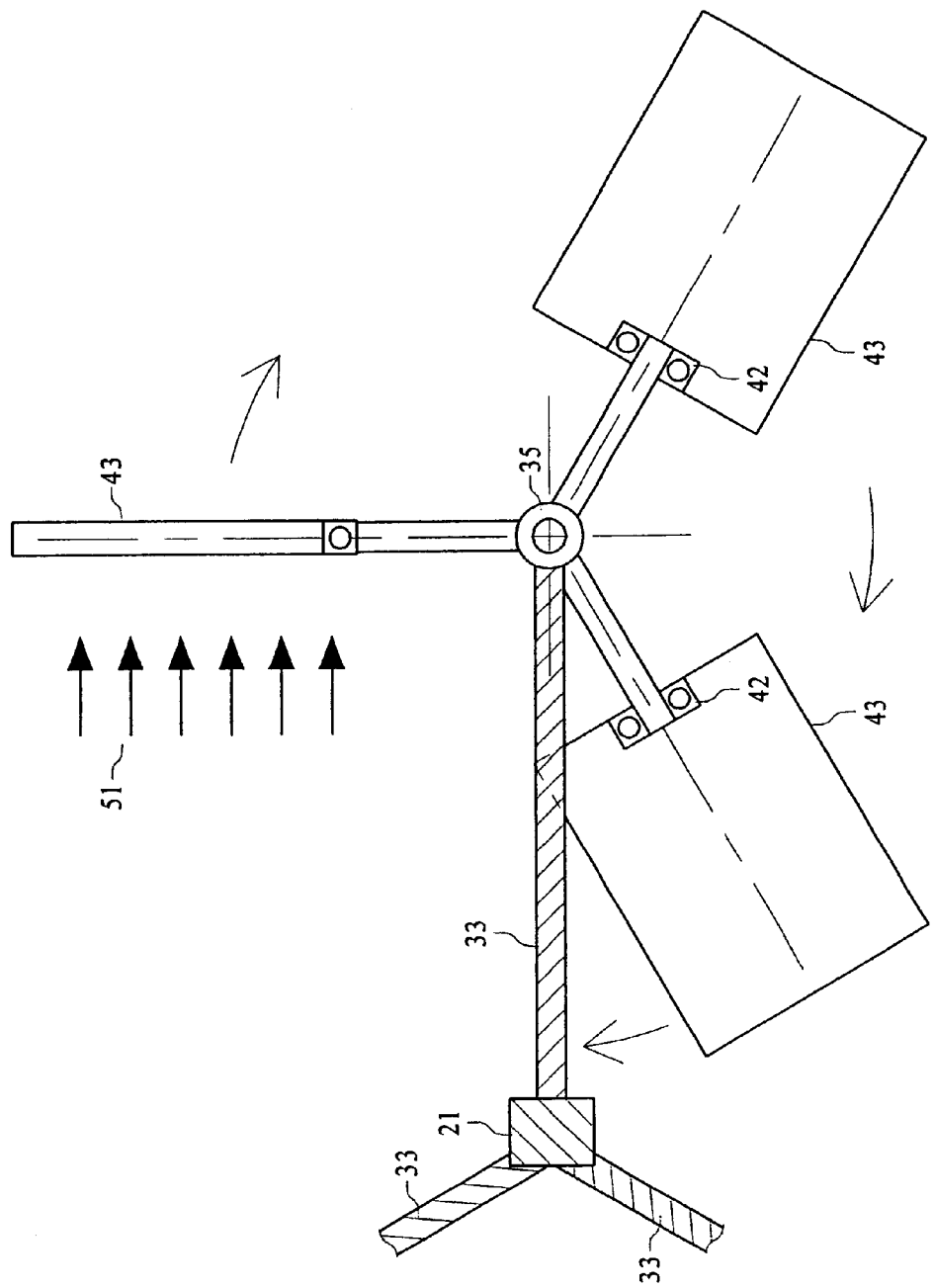
FIG. 4 is a schematic view showing the wind direction and the swinging way of the wind blade of FIG. 2A.
Figure 5:
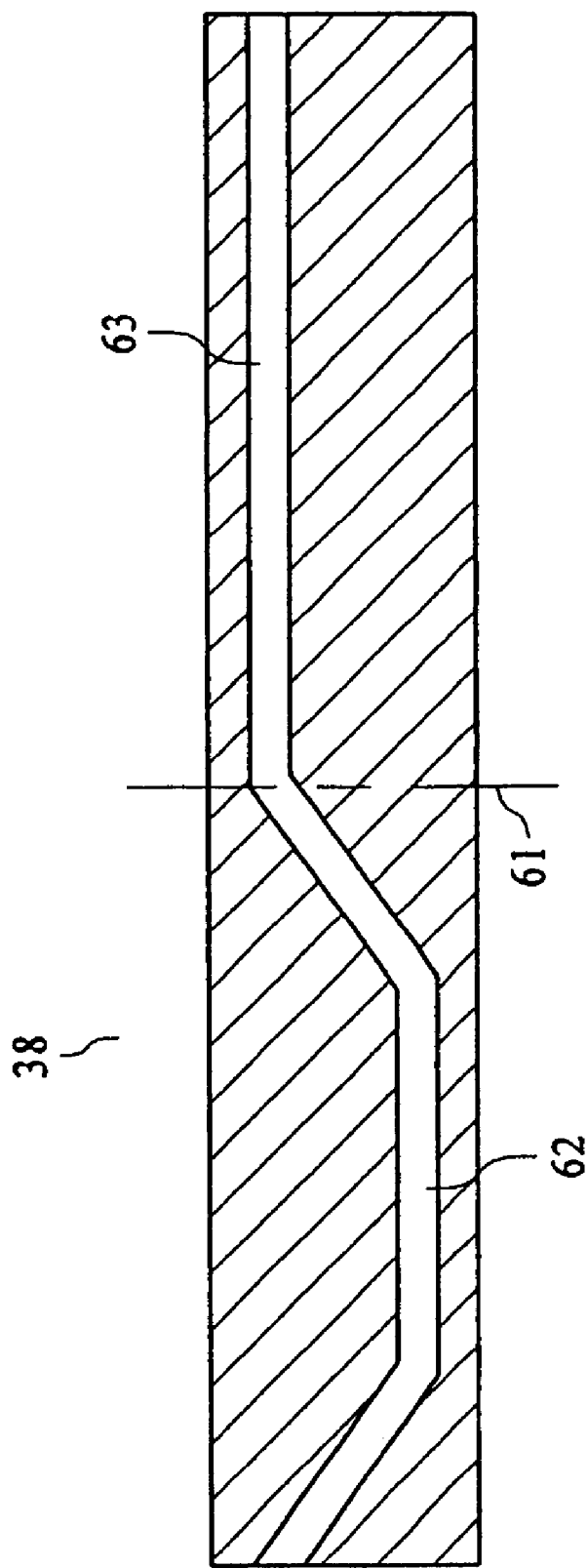
FIG. 5 is an expanded view of cam groove shown in FIG. 3.

The direction blade 37 and the wind blade 43 in FIG. 3 are driven by wind. The direction blade 37 rotates along the wind direction so as to stop in certain orientation, and therefore, the cam 38 is fixed. The wind causes the wind blade 43 to drive the transmission shaft 35 to rotate. When the transmission shaft 35 rotates, the wind blade 43 will move with the wind direction. If the blade is vertical to the wind direction, a maximum wind force is obtained. If the wind blade 43 is reversed with the wind direction, it will be horizontal with the wind direction, then a minimum wind resistance is obtained. FIGS. 4, 5 and show the swing way of the wind blade and the wind direction.

FIG. 4 is a schematic view showing the wind direction and the swinging way of the wind blade 43. As the transmission shaft 35 rotates, the wind blade 43 is supported by a bearing 42, which may rotate to be vertical to the wind direction. The wind blade 43 reversing the wind direction 51 rotates to be horizontal. The swinging of the wind blade 43 is controlled as that shown in FIGS. 5 and 6.

FIG. 5 is an expansion view of cam groove. The central line 61 in FIG. 5 represents one half of the cam groove. The cam groove may allow a pulley to move therewithin. When the pulley moves to a descending groove 62, the pulley will descend. When the pulley moves to a lifting groove 63, the pulley will be lifted.

Figure 6:
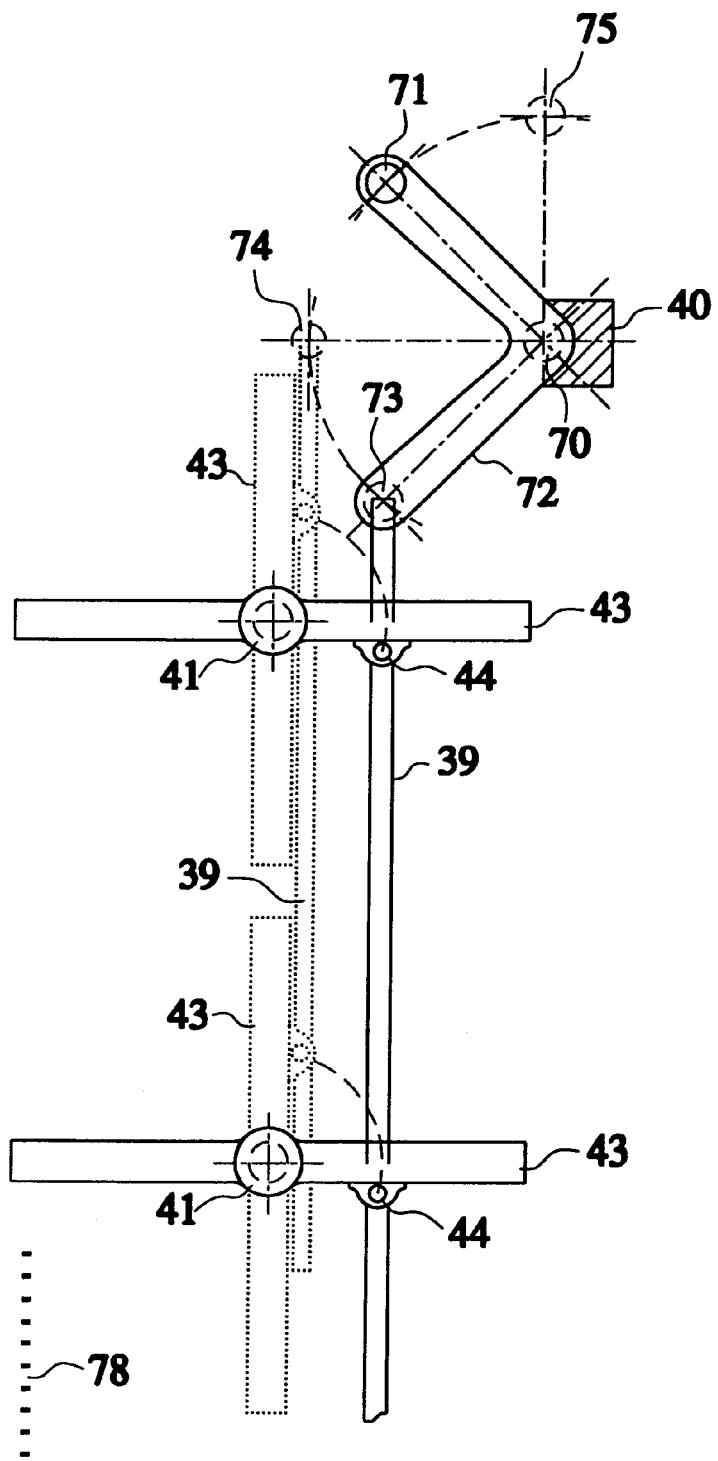
FIG. 6 is a linkage shown in FIG. 3 that is connected to a crank through a fulcrum.

In FIG. 6, the linkage 39 is connected to a crank 72 through a fulcrum 73. The crank 72 is supported by a supporting shaft 40, and the fulcrum 70 serves as a rotary shaft. The supporting shaft 40 is fixed to the transmission shaft 35 shown in FIG. 3. The linkage 39 and the crank 72 will rotate synchronously with the transmission shaft 35. The fulcrum 71 is a sliding shaft moving within the cam groove of FIG. 5. When the pulley shaft moves to the lifting groove 63 of FIG. 5, the fulcrum 71 will move to the point 75, and the fulcrum 73 will move to the point 74. Then, the linkage 39 moves to the position of the linkage 39. The sleeve 44 is fixed to the wind blade 43. The sleeve 44 is driven by the linkage 39. Therefore, as the linkage 39 moves to the lifting position of the linkage 39, the wind blade 43 moves to a position vertical to the wind blade 43. Thus, the wind blade 43 is vertical to the wind direction and suffers a maximum force. As the fulcrum 71 moves to the descending groove 62 of FIG. 5, the linkage 39 will drive the wind blade 43 to be arranged horizontally. The extension 78 represents the assembling of the linkage 39 and the wind blade 43.

In FIG. 3, there are three sets of assembly of linkage 39 and wind blade 43 which are spaced with an equal angle. Since the direction blade 37 will move along the wind blade to be fixed in one orientation cam 38 is fixed. Thus, when any assembly of the linkage 39 and the wind blade 43 moves to an orientation along the wind direction, the transmission shaft 35 will obtain power. As the transmission shaft 35 turns one circle, each wind blade will convert one wind energy. Finally, the power of the transmission shaft 35 is from an air power (compressing air, or absorption air) through the curved shaft 46 of the curved wheel 45, a linkage 47 and a supporting shaft 48 to an air pump 49. When the strength of the wind force is varied, the transmission shaft 35 will change the rotary speed. The air pump 49 changes the variation of rotary speed into the dynamic power of air. The number of assemblies of the wind blades 43 can be selected as required.

Figure 7:
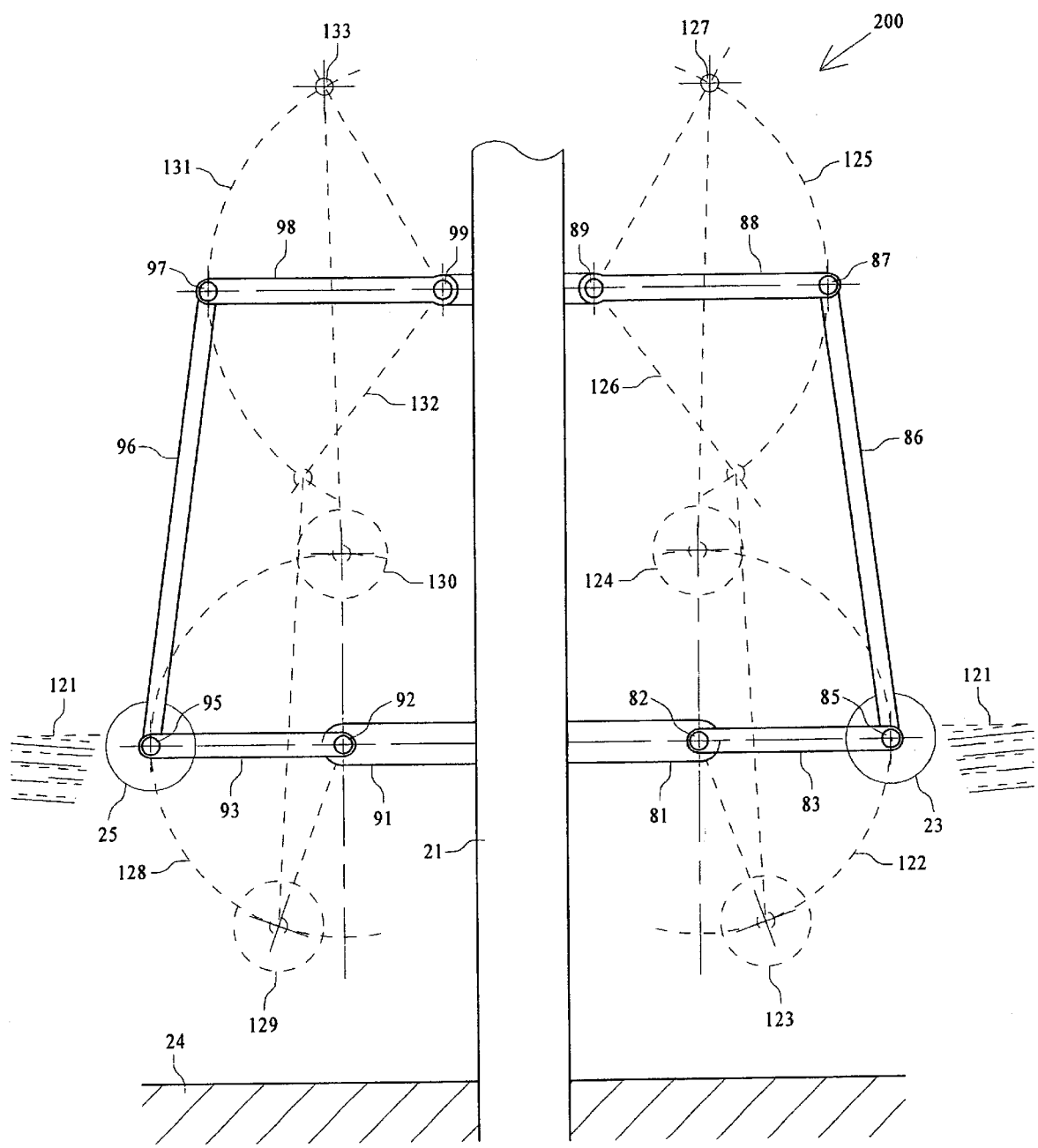
FIG. 7 is a detailed view of the sea wave energy conversion device shown in FIG. 2B.

FIG. 7 shows the sea wave energy conversion 200. The supporting base 81 is fixed in sea with a height of sea level 121. One end of the linkage 83 is connected to the supporting base 81 by a supporting shaft 82. Another end thereof is connected to the pontoon 23 by the supporting shaft 85. One end of the linkage 86 is connected to the pontoon 23 by the supporting shaft 85, while another end is connected to the linkage 88 through the supporting shaft 87. The linkage 88 is fixed to the supporter 21 by the supporting of the supporting shaft 89.

The supporting base 91 of FIG. 7 is fixed in sea with a height of sea level 121. One end of 93 is connected to the supporting base 91 through the supporting shaft 92, while another end thereof is connected to the pontoon 25 through the supporting shaft 95. One end of the linkage 96 is connected to the pontoon 25 through the supporting shaft 95, while another end thereof is connected to the linkage 98 through the supporting shaft 97. The linkage 98 is fixed to the supporter 21 by the supporting of the supporting shaft 99.

When the sea level 121 in FIG. 7 rises, the pontoon 23 rises along the track 122 by the buoyancy of the pontoon. Through the linkage 86, the linkage 88 will move counterclockwise a long the track 125. Similarly, pontoon 25 will rise due to its buoyancy along a track 128. Through the linkage 96, the linkage 98 will move clockwise along the track 131.

As the sea level 121 in FIG. 7 descends, the pontoon 23 will descend due to the weight of itself and the linkage along a track 122. Through the linkage 86, the linkage 88 will move clockwise along the track 125. Similarly, the pontoon 25 will descend due to the weight of itself and linkage along a track 128. Through the linkage 96, the linkage 98 will move counterclockwise along the track 131.

In FIG. 7, the pontoon 23 moves along the track 122, thus, it can match with the level change of sea tide to convert the energy of sea wave. The lowest water level allowable is at the position of point 123, while the highest one is at point 124, while the respect positions of the linkage 88 are point 126 and point 127. Similarly, the pontoon 25 displaces along the track 128, thus, it can match with the level change of sea tide to convert the energy of sea wave. The lowest water level allowable is at the position of point 129. While the highest one is at point 130, while the respect positions of the linkage 98 are point 132 and point 133.

In FIG. 7, the displacement energies of the linkages 88 and 98 represents the converting energies of the pontoon 23 and pontoon 25 driving by the energy of sea tide. The transformation of these energies are shown in FIG. 8.

Figure 8:
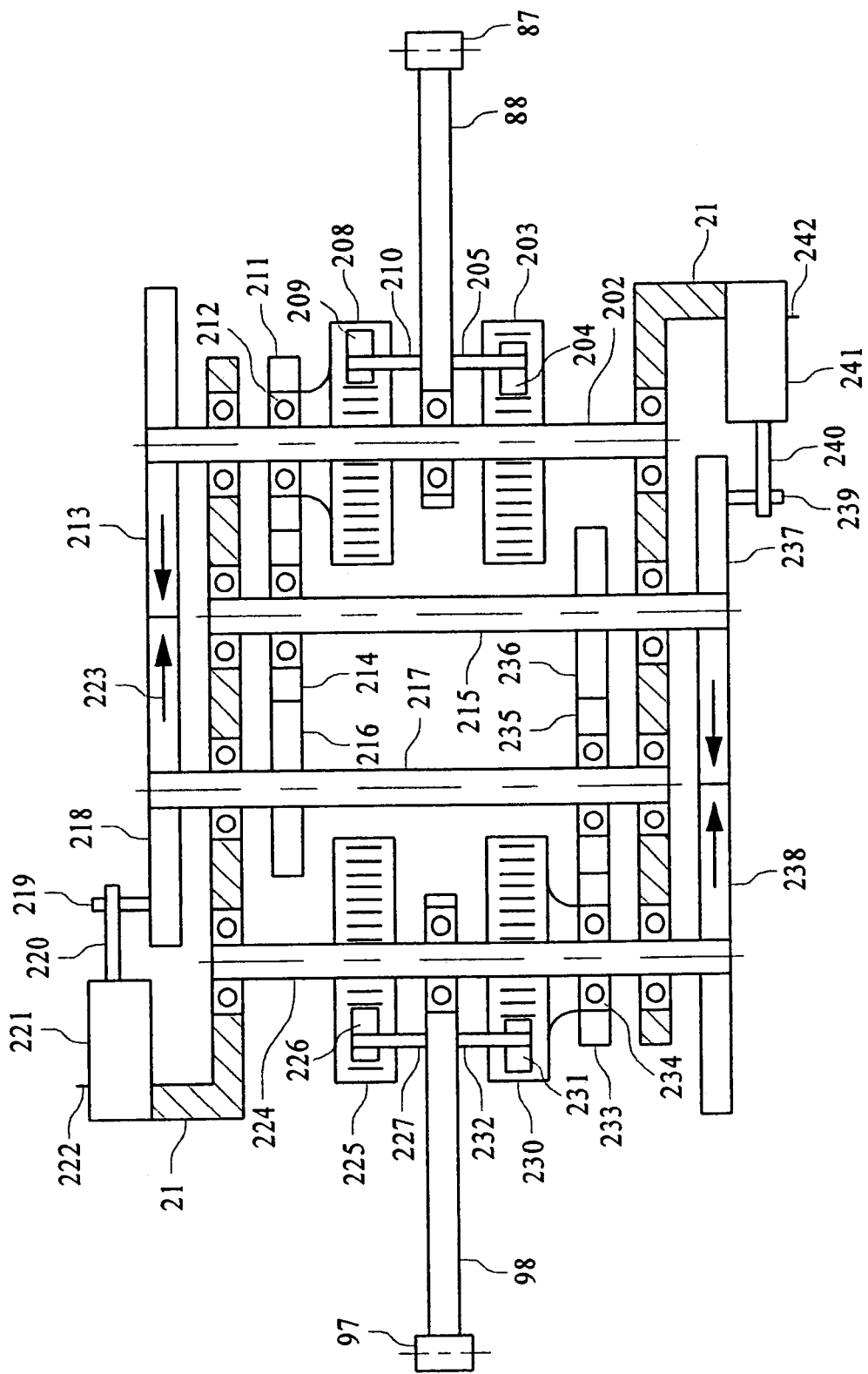
FIG. 8 is an upper view of the energy transformation of pontoon dynamic energy of FIG. 7.

FIG. 8 shows the energy transformation of pontoon dynamic energy. In FIG. 8, one end of the linkage 88 is a supporting shaft 87, while another end thereof is engaged with shaft 202 by a bearing. Thus, the swinging of the linkage 88 is around the shaft 202. Two ends of the shaft 202 are engaged on the supporter 21. A ratchet 203 is fixed to the shaft 202 and thus may operate synchronously. The palm 204 is assembled with the ratchet 203 and is fixed to the linkage 88 by the supporting rod 205. As the linkage 88 swings counterclockwise, the palm 204 pushes the ratchet 203. As the linkage 88 swings clockwise, the palm 204 is released and swings back. A ratchet 208 is connected with a gear 211 as an integral body. The body is engaged on the shaft 202 by a bearing 212. The palm 209 is assembled with the ratchet 208 and is fixed to the linkage 88 through a supporting rod 210. As the linkage 88 swings clockwise, the palm 209 pushes the ratchet 208. As the linkage 88 swings counterclockwise, the palm 209 is released and swings back. A gear 211 drives a gear 214. The gear 214 is engaged with the shaft 215 by a bearing. The gear 214 drives the gear 216. The gear 216 and the gear 218 are fixed on the shaft 217. The gear 218 is further engaged with the gear 213, as indicated by the numeral 223. The gear 213 is fixed on the shaft 202. The curved shaft 219 is positioned on the gear 218. Through a curved rod 220, an air pump 221 is driven. The air pump 221 is fixed on the supporter 21. The air energy is outputted from an air outlet 222.

In FIG. 8, one end of a linkage 98 is a supporting shaft 97, and another end thereof is engaged in shaft 224 by a bearing. Thus, the linkage 98 swings around the shaft 224. Two ends of the shaft 224 are engaged on the supporter 21 by a bearing. The ratchet 225 is fixed on the shaft 224 and thus is operated synchronously. A palm 226 is assembled to a ratchet 225, which are fixed to a linkage 98 by a supporting shaft 227. As the linkage 98 swings clockwise, the palm 226 pushes the ratchet 225. As the linkage 98 swings counterclockwise, the palm 226 is released and swings back. The ratchet 230 and the gear 233 are connected as a body. The body is engaged on the shaft 224 by a bearing 234. The palm 231 is assembled with the ratchet 230, and is fixed on the linkage 98 by a supporting shaft 232. As the linkage 98 swings counterclockwise, the palm 231 pushes the ratchet 230. As the linkage 98 swings clockwise, the palm 231 released and swings back. The gear 233 drives the gear 235. The gear 235 is engaged on the shaft 217 by a bearing. The gear 235 drives the gear 236. The gear 236 and 237 are all fixed on the shaft 215. The gear 237 is further engaged with the gear 238. The gear 238 is fixed on the shaft 224. A curved shaft 239 is placed on the gear 237. By the curved rod 240 to drive the air pump 241 which is fixed on the supporter 21, air energy is output from an air outlet 242.

The linkage 88 and supporting shaft 87 in FIG. 8 is the linkage 88 and supporting shaft 87 in FIG. 7. When the sea wave rises, the linkage 88 moves counterclockwise, the ratchet 203 will drive the gear 213 to push the air pump 221 through the gear 218 to generate air energy. Then, the gear 218 will drive the gear 216, gear 214 and gear 211 so that the ratchet 208 move clockwise, while the palm 209 assembled therewith is in a releasing state.

When the sea wave descends, the linkage 88 swings clockwise, the ratchet 208 will drive the gear 211 to push air pump 221 through the gears 214, 216 and 218 to generate air energy. Then, the gear 218 also drives the gear 213 and ratchet 203. The ratchet 203 moves counterclockwise, while the palm 204 assembled is in a releasing state. It is known that when the sea wave rises or descends, the gear 218 moves in the same direction. The amount of displacement of the sea wave is positive proportional to the rotary degree of the gear 218. Therefore, the energy of air wave can be converted as energy of air by the air pump 221.

The linkage 98 and supporting shaft 97 in FIG. 8 is the linkage 98 and supporting shaft 97 of FIG. 7. As the sea wave rises, the linkage 98 moves clockwise, the ratchet 225 will drive the gear 238 to push the air pump 241 through the gear 237 to generate air energy. Then, the gear 237 also drives the gears 236, 235 and 233 so that the ratchet 230 rotates counterclockwise and the palm 231 assembled is in a releasing state.

When the sea wave descends, the linkage 98 swings counterclockwise, the ratchet 230 will drive gear 233 to drive the air pump 241 through gears 235, 236 and 237 so as to generate air energy. Then, the gear 237 drives the gear 238 and ratchet 225, and the ratchet 225 rotates clockwise, while the palm 226 assembled is in a releasing state. It is known, whenever the sea wave rises or descends, the gear 237 may operate in the same direction. The amount of displacement of sea wave is positively proportional to the rotation of the gear 237. Thus, the energy of sea wave all can be converted into the energy of air by the air pump 241.

Figure 9:
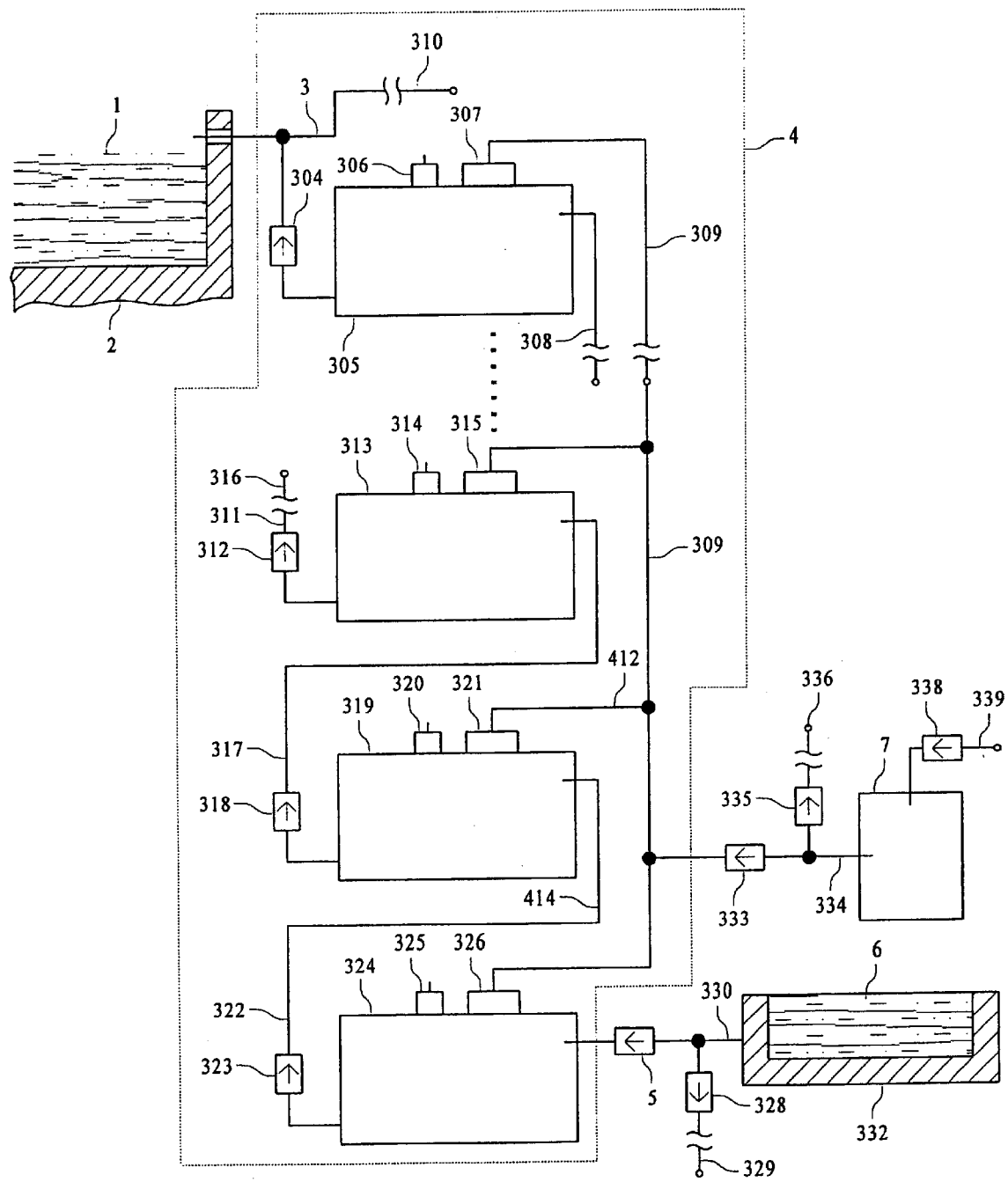
FIG. 9 is a diagram showing that a high pressure air serves to rise the water level.

FIG. 9 shows that a high pressure air serves to rise the water level. In FIG. 9, a water tube 3 is connected to a check valve 304 from a high level in reservoir 2, and then is connected to the lower portion of a water box 305. Other than connecting tubes, others of the water box 305 are closed. The air valve 306, air valve 307 and water tube 308 are connected at the upper portion of the water box 305. The air tube 309 is connected to the air valve 307. The extension 310 is connected to the water tube 3. The water tube 311 is connected to the check valve 312 and then is connected to the lower portion of the water box 313. The air valve 314 and air valve 315 are connected to the upper portion of the water box 313. The air valve 315 is connected to the air tube 309. Other than the connecting tubes, others of the water box 313 is closed. The extension 316 serves to transfer water of the water tube 311 to the water box of previous stage. One end of the water tube 317 is connected to the upper portion of water box 313, while another end thereof is connected to a check valve 318, and then is connected to the lower portion of the water box 319. The lever of the water box 319 is lower than that of the water box 313. The air valve 320 and air valve 321 are connected to the upper portion of the water box 319. The air valve 321 is connected to the air tube 309. Other than the connecting tubes, others of the water box 319 are closed. One end of the water tube 322 is connected to the upper portion of the water box 319, while another end thereof is connected to the lower portion of the water box 324 through a check valve 323. The water box 324 has a level lower than that of the water box 319. The air valve 325 and the air valve 326 are connected to the upper portion of the water box 324. The air valve 326 is connected to the air tube 309. Other than connecting tubes, others of the water box 324 are closed. One end of the water tube 330 is connected to the upper portion of the water box 324 through a check valve 5, while another end thereof is connected to the water 6 in the water source 332. One end of the check valve 328 is connected to the water tube 330, while another end thereof is connected to other water box in other set through an extension 329. One end of the air valve 333 is connected to the air tube 309, while another end thereof is connected to an air storing tank 7 through an air tube 334. One end of the air valve 335 is connected to the air tube 334, while another end thereof is connected to other air tubes in other sets through an extension 336. The air valve 338 has one end connected to the air storing tank 7, while another end thereof is connected to a high pressure air source (such as air pumps in FIGS. 6 and 8) through an extension 339.

The water 6 in FIG. 9 is at atmosphere pressure and has a level higher than that of the water box 324. When the water in water box 324 is in a low level, the air valve 325 is opened and communicates with atmosphere, and the air valve 326 is closed, thus water 6 flows into the water box 324. After water is full, the air valve 325 closes, and air valve 326 is opened, then the high pressure air in air tube 309 will flow into the water box 324 so that the water box 324 is in high pressure. Then, the check valve 5 is closed. If water in water box 319 is in lower level, then it is in atmosphere pressure, thus, the check valve 323 is opened, and the water in water box 324 flows to the water box 319 through the check valve 323 and the water tube 322. The energy of difference of the water levels of water boxes 319 and 324 are equal to the energy of difference of air pressures thereof. When the water in water box 324 is lowered to a low level again, the air valve 325 is opened and is communicated with atmosphere, and the air valve 326 is closed. Then, water 6 will flow into the water box 324 again. After water is full, the process is repeated. Similarly, the connecting tubes and processes in the water box 319, water box 313 and water box 305 are identical, such functions are shown in FIGS. 10 and 11.

Figure 10:
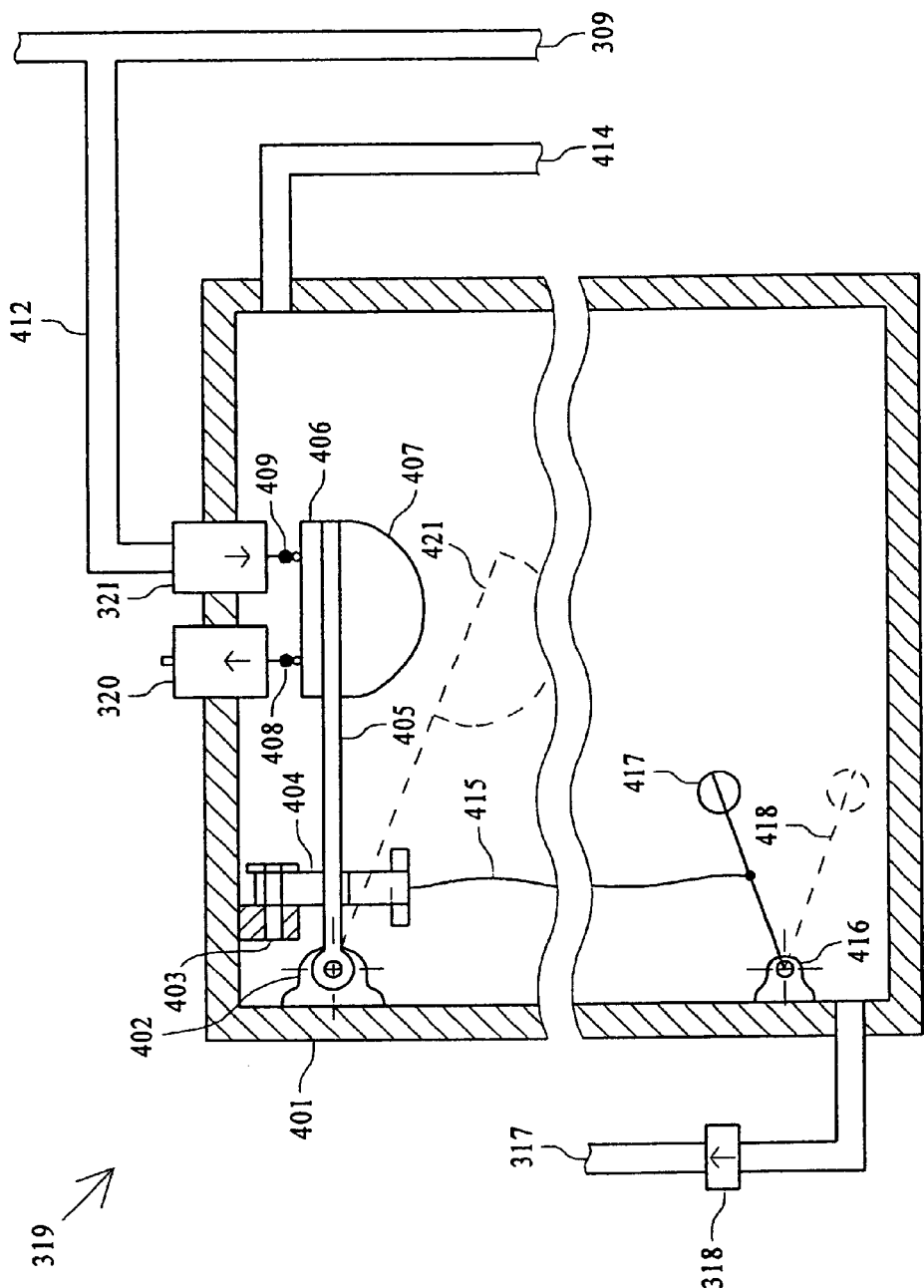
FIG. 10 is a cross-sectional view of a water box shown in FIG. 9 showing that the linkage is fixed to a housing by one end thereof and is swung thereon.
Figure 11:
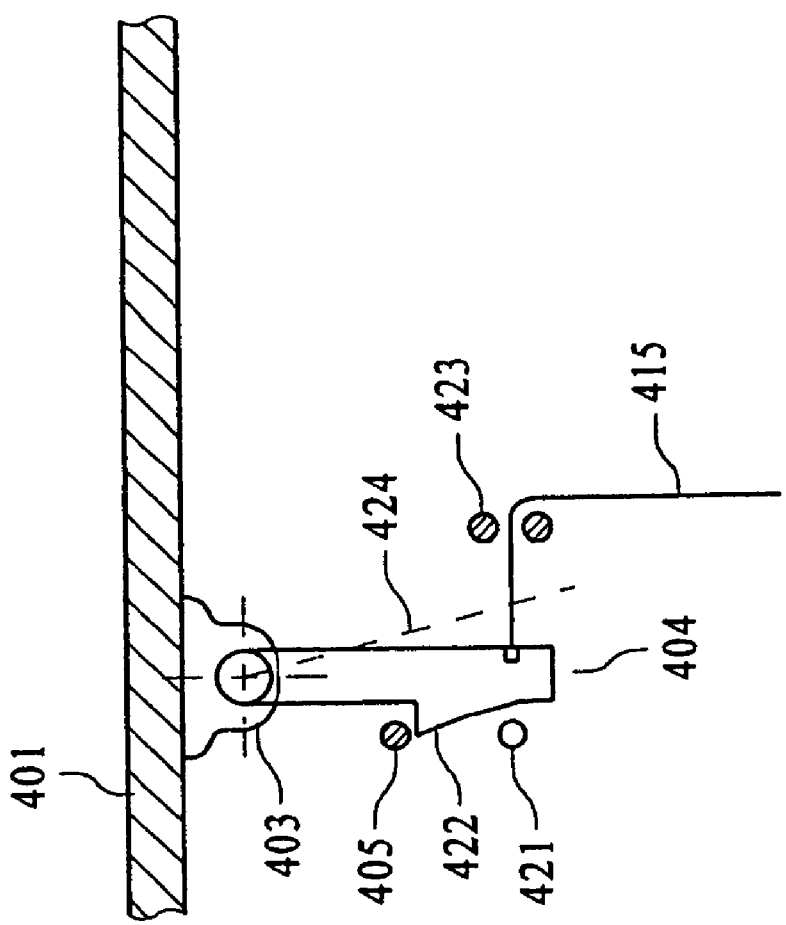
FIG. 11 is a detailed view of the displacement control of pontoons shown in FIG. 10.

In FIG. 10, one end of the linkage 405 is fixed to the housing 401 through a supporting base 402 for swinging. Another end thereof is placed with a pontoon 407 at the lower edge and is connected to a pressing block 406 at the upper edge thereof. The pressing block 406 controls the switches 408 and 409. The air valve 320 and air valve 321 are fixed on the housing 401. The outlet of the air valve 320 is communicated with the outlet. The air valve 321 is connected to a high pressure source air tube 309 by a air tube 412. Water flows into a water box through a water tube 414. One end of the rope 415 is connected to the linkage 404, while another end is connected to the pontoon 417 through the sliding base 423 of FIG. 11. One end of the pontoon 417 is fixed to the housing 401 by a supporting base 416. The check valve 318 is connected to the water outlet tube 317. Water in water box flows out from the water outlet tube 317. As the water in water box is in low water level, the pontoon 417 stops in point 418. The linkage 405 and pontoon 417 stops in point 421. The linkage 404 stops in point 424. As the water in water box is full, the linkage 405 is hooked by the tilt surface 422 and is fixed on the upper layer.

In FIG. 10, as the water level in the water box is low, since the pontoon 417 has no buoyancy and thus, descends due to weight itself so as to stop in point 418 and thus to drive rope 415. As shown in FIG. 11, the linkage 404 stops in point 424, the linkage 405 will not be supported by the tilt surface 422 and then is descent to point 421. Since the switches 408 and 409 are not pressed by the pressing block 406 and thus are released, thus, the air valve 320 is communicated with air and the air valve 321 is closed. When the water box is in atmosphere pressure, the water in water inlet tube 414 will flow into the water box when it is pushed by a high pressure air.

In FIG. 10, when the water in water box rises gradually, the pontoon 417 will rise by buoyancy, then the rope 415 will release. The linkage 404 will swing back to the original state around a supporting base 403 due to the weight of itself.

In FIG. 10, the water in water box rises to a full level, the pontoon 407 will rise due to the action of buoyancy. The linkage 405 will push the linkage 404 through the tilt surface 422 (shown in FIG. 11). As it passes through the tilt surface 422, the linkage 404 returns to the original place. Then the linkage 405 is hooked by the tilt surface 422 and is fixed thereon. Meanwhile, the pressing block 406 on the linkage 405 will actuate the switches 408 and 409 so that the air valve 320 closes and the air valve 321 opens and is communicated with air tube 412. Then the high pressure air in the high pressure source air tube 309 will flow into the water box so that the water in the water box is in high pressure. The water inlet tube 414 is connected to the check valve of a water tube in the next stage. Therefore, as the water box is in high pressure, the check valve will close. Since the water outlet tube 317 is connected to the water inlet tube in the previous stage. If the water box in the previous stage is in lower level, and is in atmosphere pressure, the water in the water outlet tube 317 flows into the water box in previous stage until the water in water box descends to a low level and the pontoon 407 descends, water is input again.

In FIG. 9, as the water box 324 in the lowest layer is in a full state, the high pressure air in the air tube 309 will flow into the water box to enforce the water in the water box will flow into the water box 319 through the check valve 323 and the water tube 322. Similarly, as the water in water box 319 is in a full state, the high pressure air in the air tube 309 flows into the water box to enforce the water in water box to flow to the water box in previous stage through the check valve 312 and the water tube 311. As the extension 316, the number of water boxes can be selected as required. Finally, as the water box 305 is in a full state, the high pressure air in the air tube 309 will flow into the water box to enforce the water in the water box flows into the reservoir 2 through the check valve 304 and the water tube 3.

Figure 12:
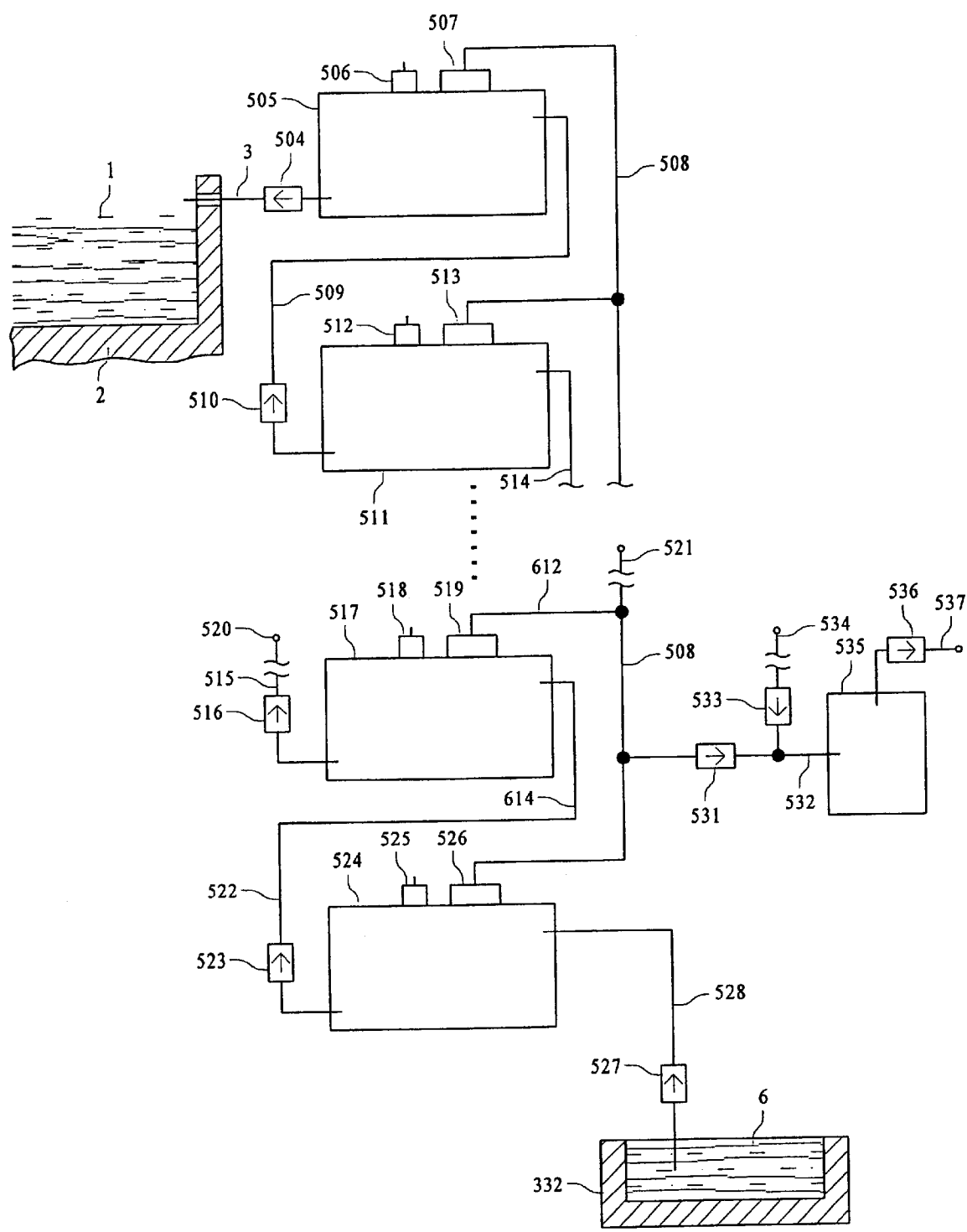
FIG. 12 is a diagram showing that a low pressure air serving to rising the water level.

In FIG. 12, the water tube 3 is connected to a check valve 504 at the lower portion of the water box 505 from the highest level of a reservoir 2. Other than connecting tubes, others of the water box 505 are closed. The air valve 506, air valve 507 and water tube 509 are connected to the upper portion of the water box 505. The air tube 508 is connected to the air valve 507. Another end of the water tube 509 is connected to the lower portion of the water box 511 through check valve 510. The water box 511 is lower than that of the water box 505 with a distance. The air valve 512, air valve 513 and water tube 514 are connected to the upper portion of the water box 511. The air tube 508 is connected to the air valve 513. Other than connecting tubes, others of the water box 511 are closed. The water tube 515 is connected to the lower portion of the water box 517 through a check valve 516. The air valve 518 and air valve 519 are connected to the upper portion of the water box 517. The air tube 508 is connected to air valve 519. Other then connecting tubes, others of the water box 517 are closed. Extension 520 is connected to the water inlet tube in previous water box. The extension 521 is connected to the air tube 508. One end of the air tube 522 is connected to the upper portion of the water box 517, while another end thereof is connected to the lower portion of the water box 524 through a check valve 523. The level of the water box 524 is lower than that of the water box 517 with a distance. The air valve 525 and air valve 526 are connected to the upper portion of the water box 524. The air valve 526 is connected to the air tube 508. One end of the water tube 528 is connected to the upper portion of the water box 524 through a check valve 527. While another end thereof is connected to water 6 in the water source 332. Other then connecting tubes, others of the water box 524 are closed. One end of the air valve 531 is connected to the air tube 508, while another end thereof is connected to the a low pressure air barrel 535 through an air tube 532. One end of the air valve 533 is connected to the air tube 532, while another end thereof is connected to other tubes through extension 534. One end of the air valve 535 is connected to the lower pressure air barrel 535, while another end thereof is connected to a low pressure air source (such as air pumps in FIGS. 6 and 8) through an extension 536.

Figure 13:
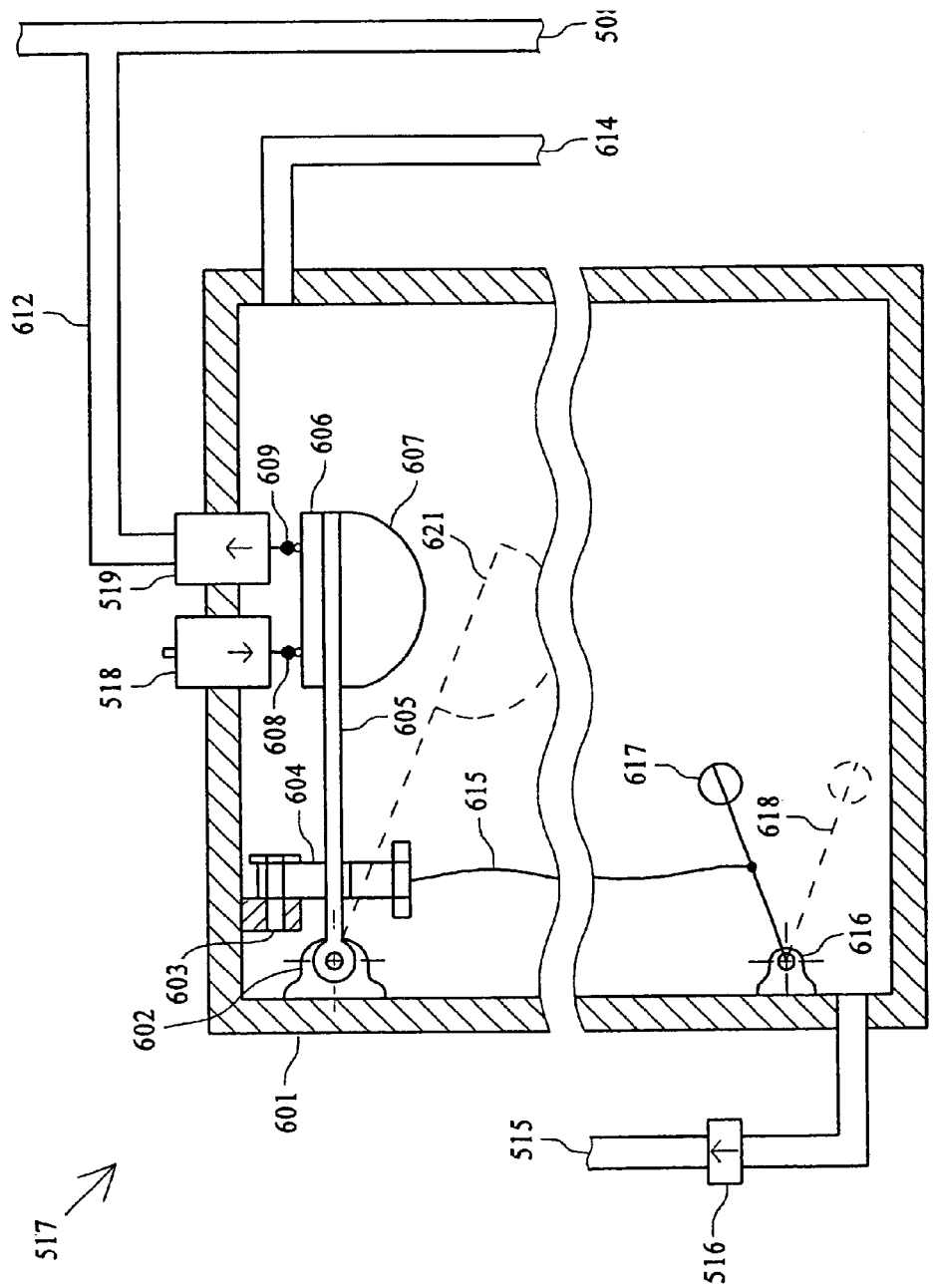
FIG. 13 is a cross-sectional view of a water box shown in FIG. 12 showing that the linkage is fixed to a housing by one end thereof and is swung thereon.
Figure 14:
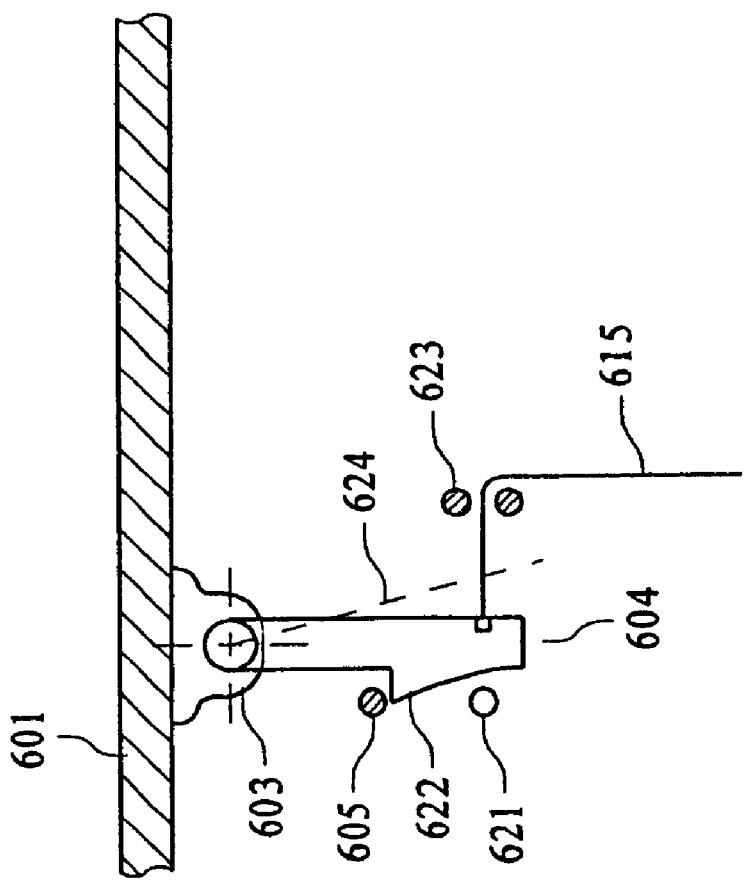
FIG. 14 is a detailed view of the displacement control of pontoons shown in FIG. 13.

Water 6 of FIG. 12 is in atmosphere pressure with a level lower than that of water box 524 with a distance. When the water in water box 524 is in low level, the air valve 525 is closed, and the air valve 526 is opened, then the air in the water box 524 will flow out through the air tube 508 so that the water box 524 is in low pressure. If the water in water box 517 is at atmosphere pressure, the check valve 523 will close, since the water 6 is in atmosphere pressure, the check valve 527 is opened. Thus, water 6 will flow into the water box 524. After the water is full, the air valve 525 is opened, and the air valve 526 is closed, then the water within the water box 524 is in atmosphere pressure. Then, the check valve 527 is closed. Similarly, water in water box 517 is at low level, the air valve 518 is closed, and the air valve 519 is opened, then the air in the water box 517 will flow out through the air tube 518 so that the water box 517 is in low pressure. Then, the check valve 523 is opened. Since the water in water box 524 is in atmosphere pressure, the water flows into the water box 517 through the water tube 522. After water is full, the air valve 518 is opened, and the air valve 519 is closed. Thus, the water in water box 517 is again in atmosphere pressure. The energy from the difference of water levels of the water box 517 and the water box 524 are equal to the energy from the difference of air pressures thereof. When water in the water box 524 is again reduced to a low level, the air valve 525 is closed, and the air valve 526 is opened, then water 6 will flow into the water box 524. After water is full, the process is repeated. Similarly, the connecting tubes in the water box 511 and water box 505 are the same working processes, such as those shown in FIGS. 13 and 14. FIG. 13 has similar means as those in FIG. 10. Only difference is the flowing way of air and air valves. The means of FIG. 14 are all identical to that of FIG. 11.

In FIG. 13, one end of the linkage 605 is fixed to the housing 601 through a supporting base 602 for swinging. The lower edge of another end thereof is placed with a pontoon 607 and the upper edge thereof is connected to the pressing block 606. The pressing block 606 actuates the switches 608 and 609. The air valve 518 and air valve 519 are fixed to the housing 601. The outlet of air valve 518 is communicated with atmosphere. The air valve 519 is connected to a lower pressure source 508 through an air tube 612. Water flows into a water box through a water inlet tube 614. One end of rope 615 is connected to a linkage 604, and another end thereof is connected to the pontoon 617 through the sliding base 623 of FIG. 14. One end of the pontoon 617 is fixed to the housing 601 by a supporting base 616 for swinging. The check valve 516 is connected to the water outlet tube 515. Water in water box may flow out from the water outlet tube 515. When the water in water box is in a low water level, the pontoon 617 stops in point 618, and the linkage 605 and pontoon 617 stop in point 621. The linkage 604 stops in point 624. As the water in water box is in a full level, the linkage 605 is hooked by tilt surface 622 so as to stop at an upper layer.

In FIG. 13, as water in water box is in a low level, since the pontoon 617 has no buoyancy, it will descend by the weight itself as to stop in point 618. Then the rope 615 is driven. As shown in FIG. 14, the linkage 604 stops in point 624, then linkage 605 will not be supported by the tilt surface 622 and then descend to point 621. Since the switches 608 and 609 are not pressed by the pressing block 606 and thus is released, the air valve 518 is closed, and air valve 519 is opened, then air in water box will flow into a low pressure source air tube 508 through the air tube 612 so that the water box is in a low pressure state. Meanwhile, the check valve 516 will close. When the air pressure within the water box is lower to a predetermined level, the water connected to the water inlet tube 614 and in atmosphere pressure will flow into the water box.

In FIG. 13, when the water in water box rises gradually, the pontoon 617 will rise due to buoyancy, then the rope 615 is released. Thus, the linkage 604 swings back around the supporting base 603 by the weight itself.

In FIG. 13, when the water in water box rises to a full level, the pontoon 607 will rise due to the action of buoyancy. As the linkage 605 passes through the tilt surface 622, it will push away the linkage 604, while as it has passed out of the tilt surface 622, the linkage 604 will return to the original state. The linkage 605 is hooked by the tilt surface 622 and therefore is fixed thereon. At the same time, the pressing block 606 on the linkage 605 will actuate the switches 608 and 609 so that the air valve 518 is opened and the air valve 519 is closed. When the air valve 518 is opened, the air flows into the water box, so that the water in the water box is in the atmosphere pressure. The water inlet tube 614 is connected to the check valve of next water tube. Therefore, as the water in the water box is in atmosphere pressure, the check valve also closes (until the water in the water box is again reduced to a low level to present a low pressure state, the check valve is opened). Since the water outlet tube 515 is connected to the water inlet tube of the previous water box. If the water box in previous stage is in low level, the air pressure is in low pressure, thus, water in water outlet tube 515 flows into the previous water box until the water in water box is again reduced to a low level and the pontoon 607 descends, the water enters again.

In FIG. 12, as the water box 524 in the lowest layer is in low level, the water box 524 is communicated with the air tube 508 and is in low pressure, thus, the water 6 in water source 332 has a high pressure (atmosphere pressure), which will flow into the water box 524 through the water tube 528. Similarly, as the water of water box 519 is in low level, the water box 519 will communicate with air tube 508 and thus is in a low pressure. Therefore, as the water box 524 in the next layer has a high pressure (atmosphere pressure), water flows into the water box 519 through the water tube 522. As the extensions 520 and 521, the number of water boxes can be selected as required. Similarly, as the water in the water box 511 is in a low level, the water box 511 is communicated with the air tube 508 to be in a low pressure, thus the water box in the next layer is in high pressure (atmosphere pressure), the water in water box will flow into the water box 511 through the water tube 514. Similarly, the water in water box 505 is in a low level, the water box 505 is communicated with the air tube 508 so as to be in low pressure. Thus, the water box 511 in the next stage is in a high pressure (atmosphere pressure), water will flow into the water box 505 through the water tube 509. When the water in water box 505 is full, the air valve 506 is opened to be in high pressure (atmosphere pressure), then, water in water box 505 will flow to the reservoir 2 through the check valve 504.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An energy accumulating device, comprising: one high pressure air source and a plurality of water boxes, each two adjacent water boxes are spaced with a distance, other then connecting tubes, others of the water box are closed; water of low level flows into the water box of lowest level through a check valve; the bottom of each water box is connected with a water outlet tube which enter into the water box through a check valve; each water box is connected to two air valves, one is communicated with atmosphere, the other serves to connect a high pressure air transmission tube to an air storing tank; a pontoon is arranged within the water box, the pontoon is fixed to the case of the water box by a supporting base of a linkage and is thus swingable; a pressing block is arranged above the pontoon; when the water within the water box is full, the pressing block actuates the switches of the two air valves, then, the linkage of the pontoon is hooked by a tilt surface; when one end of the tilt surface is fixed to the upper case of the water box, and another end thereof is connected to a rope; the rope is further connected to another pontoon at a bottom of the water box, this pontoon is fixed to the bottom of the case of water box and is thus swingable; when the water within the water box descends to the bottom, the pontoon at the bottom will descend so as to pull the rope, and thus to move the tilt surface away and the hooked linkage will descend by the weight of the pontoon so as to release the switches of the air valve.

2. An energy accumulating device, comprising: one low pressure air source and a plurality of water box, each two adjacent water boxes are spaced with a distance, other then connecting tubes, others of the water box are closed; water of low level flows into the water box of lowest level through a check valve; the bottom of each water box is connected to a water outlet tube which enter into the water box through a check valve; each water box is connected to two air valves, one is communicated with atmosphere, the other serves to connect a high pressure air transmission tube to an air storing tank; a pontoon is arranged within the water box, the pontoon is fixed to the case of the water box by a supporting base of a linkage and is thus swingable; a pressing block is arranged above the pontoon; when the water within the water box is full, the pressing block actuates the switches of the two air valves, then, the linkage of the pontoon is hooked by a tilt surface; when one end of the tilt surface is fixed to the upper case of the water box, and another end thereof is connected to a rope; the rope is further connected to another pontoon at a bottom of the water box, this pontoon is fixed to the bottom of the case of water box and is thus swingable; when the water within the water box descends to the bottom, the pontoon at the bottom will descend so as to pull the rope, and thus to move the tilt surface away and the hooked linkage will descend by the weight of the pontoon so as to release the switches of the air valve.

3. A system for accumulating energy for natural powers, comprising: wind energy conversion devices, sea wave energy conversion devices, air storing tanks, and energy accumulating devices, said wind energy conversion devices serve to convert wind energy into air energy, then, the air flows into the air storing tanks, and the sea wave energy conversion devices serve to convert sea wave energy into air energy, then, the air flows into the air storing tanks, then, the energy accumulating devices serves to rise water to a desired level by the stored air energy, said sea wave energy conversion device including two swingable pontoons, linkage sets, ratchets, transmission units and two air pumps, the two swingable pontoons can be installed on the two sides of the supporter respectively, the supporting shaft of the pontoon is combined with a linkage, another end of the linkage is connected to a supporting base through a supporting shaft and then is arranged on the sea level so that the pontoon may swing, the supporting base is supported by a supporter which is fixed on the bottom of sea; the linkage set is formed by two linkages which are connected by a supporting shaft; one end of the linkage set is connected to the supporting shaft of the pontoon, while another end thereof is engaged with the rotary shaft of the upper ratchet set by a bearing; two sides of the linkage have a respective supporting rod; a palm is installed on the supporting rod, which is matched with a respect ratchet; in the ratchet set, one generates power as the linkage swings counterclockwise; another generates power as the linkage swings clockwise; the ratchet swinging counterclockwise is fixed to the rotary shaft thereof; two ends of the rotary shaft are engaged to the supporter by a bearing; one side of the rotary shaft has a gear;

the power of the gear is transferred to another gear; the rotary shaft fixing the gear is engaged on the supporter by two bearings; the gear has a curved shaft which drives an air pump; the ratchet swinging clockwise is fixed with a gear, and is engaged on the rotary shaft by a bearing, the power of the gear is transferred to another gear further, which has a rotary speed is the same as the gear having a curved shaft, both two are fixed to the same rotary shaft; therefore, the power still outputs from the same air pump.

4. A system for accumulating energy for natural powers comprising wind energy conversion devices, air storing tanks, and energy accumulating devices, wherein the wind energy conversion devices serve to convert wind energy into air energy, then, the air flows into the air storing tanks, then, the energy accumulating devices serves to raise water to a desired level by the stored air energy, said sea wave energy conversion device including two swingable pontoons, linkage sets, ratchets, transmission units and two air pumps, the two swingable pontoons can be installed on the two sides of the supporter respectively, the supporting shaft of the pontoon is combined with a linkage, another end of the linkage is connected to a supporting base through a supporting shaft and then is arranged on the sea level so that the pontoon may swing, the supporting base is supported by a supporter which is fixed on the bottom of sea; the linkage set is formed by two linkages which are connected by a supporting shaft; one end of the linkage set is connected to the supporting shaft of the pontoon, while another end thereof is engaged with the rotary shaft of the upper ratchet set by a bearing; two sides of the linkage have a respective supporting rod; a palm is installed on the supporting rod, which is matched with a respect ratchet; in the ratchet set, one generates power as the linkage swings counterclockwise; another generates power as the linkage swings clockwise; the ratchet swinging counterclockwise is fixed to the rotary shaft thereof; two ends of the rotary shaft are engaged to the supporter by a bearing; one side of the rotary shaft has a gear; the power of the gear is transferred to another gear; the rotary shaft fixing the gear is engaged on the supporter by two bearings; the gear has a curved shaft which drives an air pump; the ratchet swinging clockwise is fixed with a gear, and is engaged on the rotary shaft by a bearing, the power of the gear is transferred to another gear further, which has a rotary speed is the same as the gear having a curved shaft, both two are fixed to the same rotary shaft; therefore, the power still outputs from the same air pump.

\* \* \* \* \*